Figure 1:
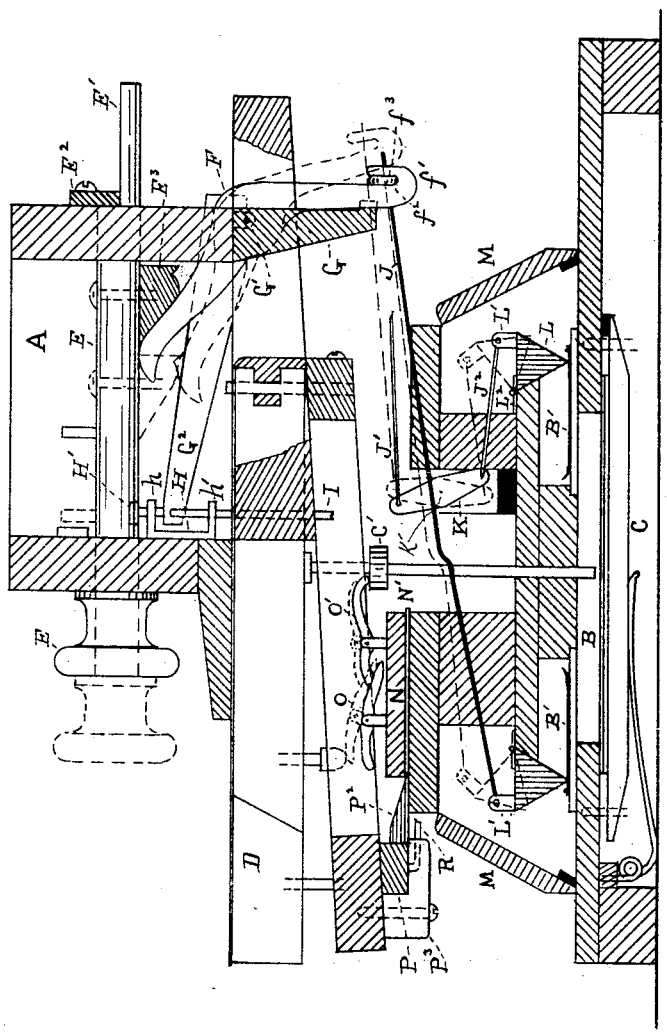

(No Model.) 3 Sheets—Sheet 1.

W. C. KANTNER.
REED ORGAN STOP ACTION.

No. 252,674. Patented Jan. 24, 1882.

Witnesses
Frank D Kinsey
Samuel T. P. Kinsey

Inventor
Washington C Kantner
pr Thomas P Kinsey
Atty (No Model.) 3 Sheets—Sheet 2.
W. C. KANTNER.
REED ORGAN STOP ACTION.
No. 252,674. Patented Jan. 24, 1882.
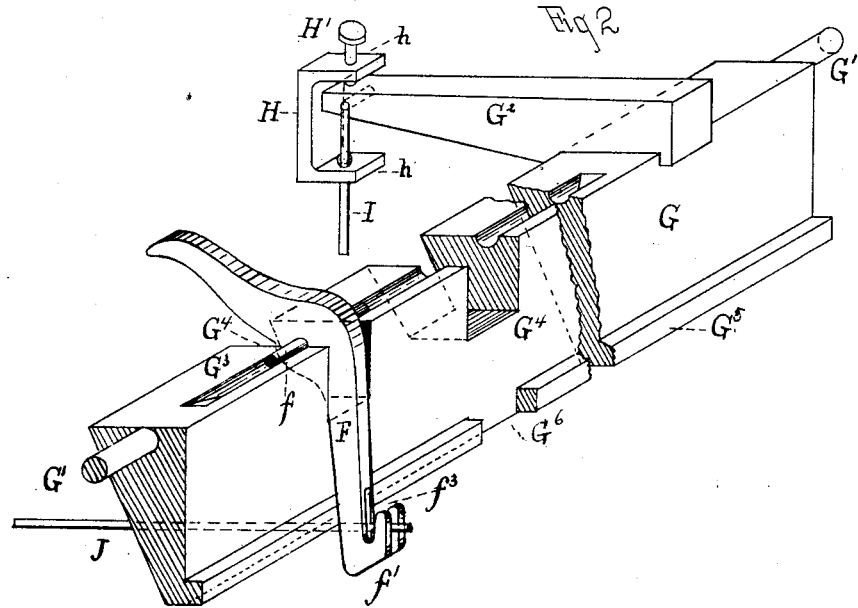
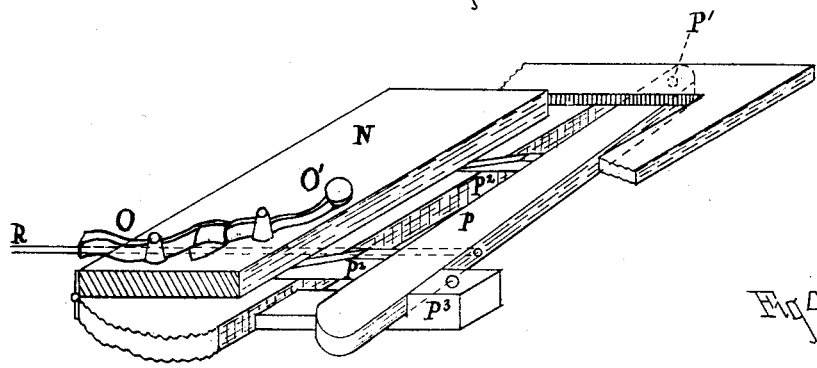
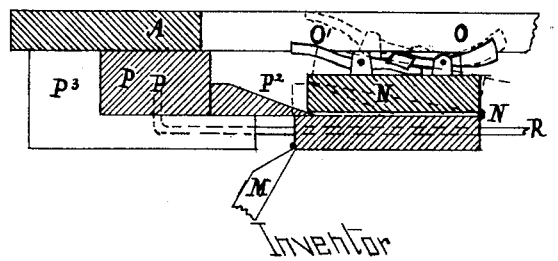
Witnesses
Frank P. Kinsey
Samuel T. P. Kinsey
Inventor
Washington C. Kantner
Pr Thomas P. Kinsey
Atty (No Model.) 3 Sheets—Sheet 3.
W. C. KANTNER.
REED ORGAN STOP ACTION.
No. 252,674. Patented Jan. 24, 1882.
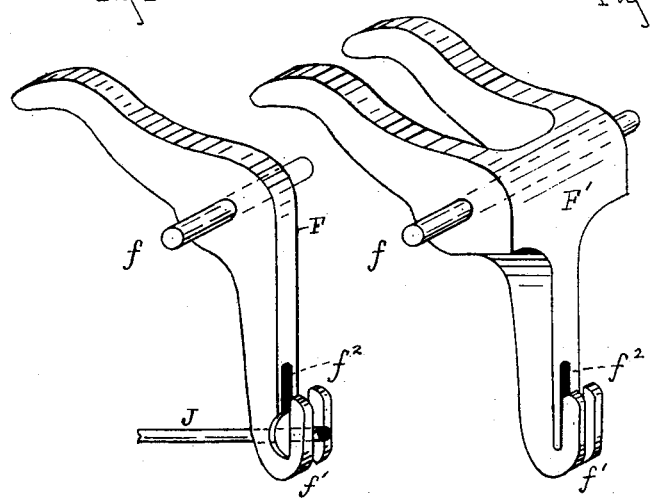
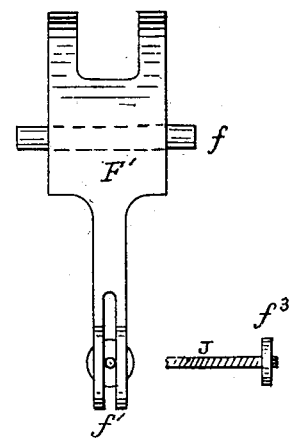
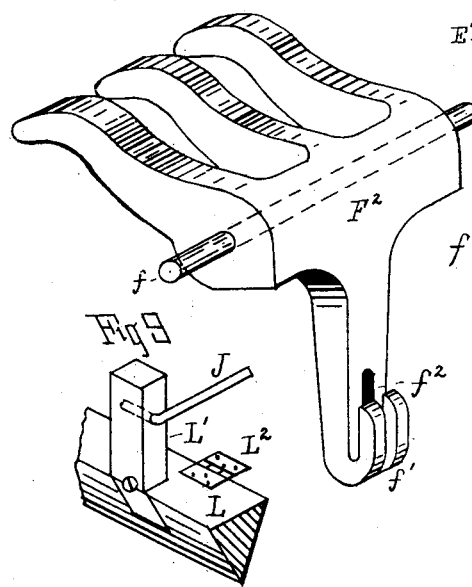
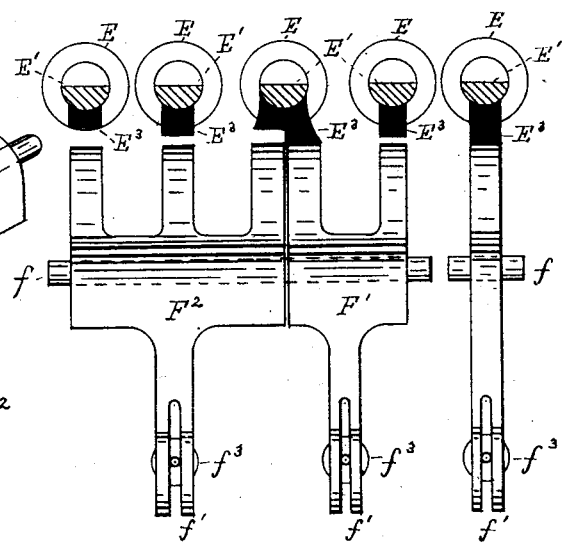
Witnesses
Frank P. Kinsey
Samuel T. P. Kinsey
Inventor
Washington. C. Kantner
pr Thomas. P. Kinsey
Att'y

UNITED STATES PATENT OFFICE.

WASHINGTON C. KANTNER, OF READING, PENNSYLVANIA.

REED-ORGAN STOP-ACTION.

SPECIFICATION forming part of Letters Patent No. 252,674, dated January 24, 1882.

Application filed October 25, 1881. (No model.)

*To all whom it may concern:*

Be it known that I, WASHINGTON C. KANTNER, of the city of Reading, county of Berks, State of Pennsylvania, have invented a new and useful Improvement in Reed-Organs, of which the following is a specification.

This improvement relates more particularly to the devices and their connections for operating the mutes and octave couplers, and comprises a system of freer and more ready adjustment than has up to this time come under my notice.

The description is sufficiently full, clear, and exact to enable those skilled in the art to which it pertains to construct and use the same, and is applicable to all the modern styles of reed-organs now in the market.

Figure 1, Sheet 1, represents a vertical transverse section of a reed-organ, illustrating my invention. Fig. 2, Sheet 2, represents a rocker-bar in accordance with my improvement, showing the combination with the positive bell-crank modulators. Fig. 3, Sheet 2, represents the octave-coupler table in perspective. Fig. 4, Sheet 2, represents a cross-section of the coupler-table and positive rest for same. Fig. 5, Sheet 3, represents a single-operative bell-crank. Fig. 6, Sheet 3, represents a double-operative bell-crank. Fig. 7, Sheet 3, represents a triplicate-operative bell-crank. Fig. 8, Sheet 3, represents an adjustant for a combined tone; Fig. 9, Sheet 3, a portion of a mute, showing wooden post and screwed connection with the tension-rod.

Similar letters of reference in all the figures refer to the same parts, in all of which A represents the frame; B, the reed-box; B', the reeds; C, the air-valves; C', the air-valve rods; D, the keys; E, stop-pulls; E', a semicircular extension of the pulls; $E^2$, stop-guides; $E^3$, modulator-blocks; F, single-acting bell-crank; F', double-acting and $F^2$ triple-acting bell-cranks, all having fulcrum-pins $f$ and provided with bifurcated gripe ends $f'$, with nut-pockets $f^2$ and leather nuts or washers $f^3$. G represents the rocker-bar; G', the rocker-bar pivots or bearings; $G^2$, rocker-bar arm or lever; $G^3$, seat for fulcrum-pins of the bell-cranks; $G^4$, notches to admit the bell-cranks; $G^5$, arrester bar or stop; $G^6$, notches cut partially into or entirely through the arrester-bar to limit the movement of the bell-cranks in the direction of the tensional strain; H, adjusting-clamp secured to the removable portion of the frame; H', adjusting-screw limiting the upward movement of the rocker-bar arm; I, connection from the rocker-bar arm to the ordinary knee-swell device, (not herein shown;) J, direct connection from the front mutes to the bell-cranks; J' $J^2$, indirect connections to the rear mutes from the bell-cranks; K, equal or unequal ended lever fulcrumed at K' for reversing and causing a direct pull upon the rear mutes; L L, the mutes, hinged, as usual, at $L^2$, and provided with connection-posts L', to which the rods J and $J^2$ are attached. M M are the swell-valves, which are raised in the usual manner by a swell-rod, (not shown herein.) N represents the octave-coupler table, hinged at N' to the top of the wind-chest, and has upon its upper side the usual octave-coupling levers, O and O'. P is a radial bar for throwing the octave-coupler into and out of gear or combination with the keys D. It is pivoted at one end on the fulcrum-pin P', and is supported at the opposite and radially-moving end upon an extension-piece, $P^3$. The bar P has connected with it, and forming part of the same, the inclines or wedges $P^2$ $P^2$, which rest upon the top of the wind-chest with their entering ends immediately under the free edge of the coupler-table N, and is controlled by the pull-rod R.

I make no change in the general construction of the valves, reeds, mutes, and swells, my improvement looking more to a simplification of the adjustments, a more ready access to the parts, and a more positive action and control of the same.

My first improvement is in adding to the stop-spindles the modulator-blocks $E^3$, which are so arranged and adjusted with relation to the bell-cranks F, F', and $F^2$ that the pull of a single stop shall give a full note on F, or of two stops in succession on F' a half and full tone, or of three stops drawn in succession over $F^2$ three tones shall be successively established; or a single stop placed common to two separate bell-cranks and provided with an adjustable modulator-block varying in height over the respective cranks will give forth a modified or compound tone, this variety in tone being obtained from any of the reed-organs now in use, without any change in reeds, mutes, or swells, simply by adding my rocker-bar and its complement of bell-cranks.

My second improvement consists in so arranging the pull-stop frame and stops with relation to the operating mechanism that the frame, with its stops, is free to be lifted and set aside without disturbing any of the connections. This will be apparent to an expert without any further explanation.

My third improvement is a new form and arrangement of the rocker-bar, together with a change of its position as usually obtained in reed-organs. The improvement is fully shown in detail in Fig. 2, Sheet 2, and in connection with the organ-action in Fig. 1, Sheet 1. The bar G is of triangular section, hanging upon trunnions or bearings G', and has sunken upon its top face, in length according to the number of stops to be operated, a groove, $G^3$, of such depth and form as will receive the fulcrum-pins $f$ of the bell-cranks F, F', and $F^2$. It is also notched out across its entire upper surface at such points as will also be determined by the stops to be used, as at $G^4$, to receive the bell-cranks F, F', and $F^2$. It is also provided with a strip, $G^5$, on the lower edge of its rear face, said strip being left uncut, partially cut, or entirely cut away at places which correspond vertically with the top notches, $G^4$; or short blocks or pins may be used instead of the strip, which is intended to be used for the purpose of limiting the drop of the mutes L. The rocker-bar is provided with the usual rocker-bar arm or lever, $G^2$; but to make all the movements positive I add in the stop-frame, in connection with the rocker-arm, a clamp-piece, H, having arms $h\,h'$. Through the upper arm, $h$, I run a set-screw, H', which limits the rise of the arm $G^2$ according to its adjustment; and the limit of the pull down of the arm $G^2$ may be regulated in the same way by a set-screw in the arm $h'$, or by blocking up on the same.

My fourth improvement consists in the use of the bell-cranks F, F', and $F^2$, already described, and of the peculiar form shown, having fulcrum-pins $f$ and bifurcated gripe ends $f'$, and set loosely in the notches provided for them in the rocker-bar, and vibrate on their fulcrum-pins $f$, which lie in the groove $G^3$ of the bar. The bell-cranks may be made of metal or of wood. I give preference to the latter. The drawing out of the stops E, bringing the modulator-blocks $E^3$ in contact with the upper arm or arms of the bell-cranks, depresses the same to a greater or less extent, according to the proportions existing between the same. This throws the lower leg or gripe end away from the rocker-bar, and, through the connecting rods J, J', and $J^2$ and the equal or unequal ended lever K, opens the mutes to the desired extent. To facilitate the adjustment of the mutes, I thread the ends of the connections J or J' where they enter the gripe end $f'$ of the bell-cranks, and, placing a hard sole-leather or equivalent nut or washer, $f^3$, in the pocket $f^2$ thereof, screw on the same until the rod J or J' is drawn taut between the mutes, arm L', and the bell-cranks F, F', or $F^2$, as shown in Fig. 1, Sheet 1, the whole arrangement being such that there can be no loose joints or lost motion, the action becoming positive in all respects. It will be seen by the dotted position of the stop and bell-crank in Fig. 1, Sheet 1, that when the stop is drawn out the position of the modulator-block with relation to the bell-crank is such that there is no tendency to disturb the position, the pull remaining in place until purposely moved. Instead of the usual link and eye connection with the arm or post L' of the mute L, I make use of a wooden post, L', as shown in Fig. 9, Sheet 3, and, threading the ends of the connecting-rods J and $J^2$, I screw them into the posts, and then bend them at right angles therewith, to connect with the gripe $f$ or the equal or unequal ended lever K.

My fifth improvement is in the manipulation of the octave-coupler table N. The plan Fig. 3 and section Fig. 4, both on Sheet 2, show very clearly the manner in which this is done, my object here, as elsewhere, being to simplify construction, give positive movement and a solid bearing. The coupler-table, as is usual, is hinged to the top of the wind-chest, the gate or radial bar P being mounted in front of the same, and having the raising inclines or wedges $P^2$ $P^2$ just entered underneath the loose edge of the table N, and is operated, as already described, by the rod R.

I am aware that it is not new to thread the ends of connecting-rods in reed-organ actions, (see Patents No. 179,959, July 18, 1876, S. Robinson, and No. 243,899, July 5, 1881, I. L. Henners,) and therefore I do not broadly claim the same; but I believe that I am the first to use the same in the manner shown, in combination with the bell-cranks F, F', and $F^2$ and mute-posts L'.

What I do claim, and for which I desire to secure Letters Patent, is as follows:

1. In combination with the pull-stop frame of a reed or other organ, the clamp H, constructed as shown, having arms $h\,h'$ and a set-screw, H', in combination with the rocker-bar arm or lever $G^2$, rocker-bar G, and organ-action bell-cranks F, F', or $F^2$, rods J J' $J^2$, lever K, and mutes L, as and for the purpose specified.

2. In combination with the pull-stops E and modulator-blocks $E^3$, as described and claimed, the bell-crank F, constructed, as shown, with bifurcated arm and single prong, whereby a single opening of the stop-mute L may be obtained through the operation of the rods J J' $J^2$, lever K, and mutes L, substantially as shown, and for the purpose described.

3. In combination with the pull-stops E and the modulator-blocks $E^3$, the bell-cranks F', constructed, as described, with two prongs, whereby through the operation of two pull-stops upon the same a full and half or medium opening of the stop-mute L will be produced by a single connection to the mute L, as described, substantially as and for the purpose set forth.

4. In combination with the pull-stops E and the modulator-blocks E³, or their equivalent, the bell-cranks F², constructed, as shown, with three prongs, whereby through the operation of three pull-stops upon the same a very small, medium, and full opening of the stop-mute L will be produced by a single connection to said mute L from the bifurcated end $f'$, through the rods J, J', and J², washers $f^3$, and lever K, to posts L', and mutes L, substantially as described, and for the purpose specified.

5. The combination of the stop-pulls E, provided with the modulator-blocks E³, with the series of bell-cranks F F' F², constructed and arranged as described, so that a single pull-stop shall have one half of its modulator-blocks seated on a prong of one bell-crank and the other half on a prong of another bell-crank placed alongside of the first, whereby on drawing the pull-stop the modulator-block, operating two different bell-cranks, will cause two different stop-mutes to be opened in two different degrees by combination with two different mutes through the rods J J' J², lever K, posts L', and mute L, as described, and substantially as and for the purpose set forth.

6. In combination with a reed or other organ, a rocker-bar, G, constructed as shown and described, provided with the usual arm or lever, G², and having trunnions or bearings G', fulcrum-pin groove G³, notches G⁴, arrester-bar or equivalent, G⁵, when combined with the bell-cranks F, F', or F², rods J J' J², lever K, posts L', and mutes L, clamp H, and set-screw H', together with pull-stops E and modulator-blocks E³, substantially as and for the purpose described.

7. In a reed-organ, the combination of the mutes L with the posts L', rods J J' J², lever K, and washer $f^3$, bell-cranks F F' F², rocker-bar G, and pull-stops E, substantially as shown and for the purpose specified.

8. The sole-leather washer or nuts $f^3$, or their equivalent, in combination with the gripe-pocket $f^2$, of the bell-cranks F F' F², rods J J' J², lever K, and mutes L, as shown, and for the purpose specified.

9. The positively-operating radial lever P, with its wedges P², fulcrum-pin P', supporting slide P³, and manipulating-rod R, in combination with the coupler-action of a reed-organ, whereby the octave-coupler is put in and out of connection and retained in either position in a solid state of rest, substantially as shown, and for the purpose described.

WASHINGTON C. KANTNER.

Witnesses:
 JAMES R. KENNEY,
 BENJAMIN BOTT.